INVENTORS
JAMES BYRON JONES
CARMINE F. DE PRISCO

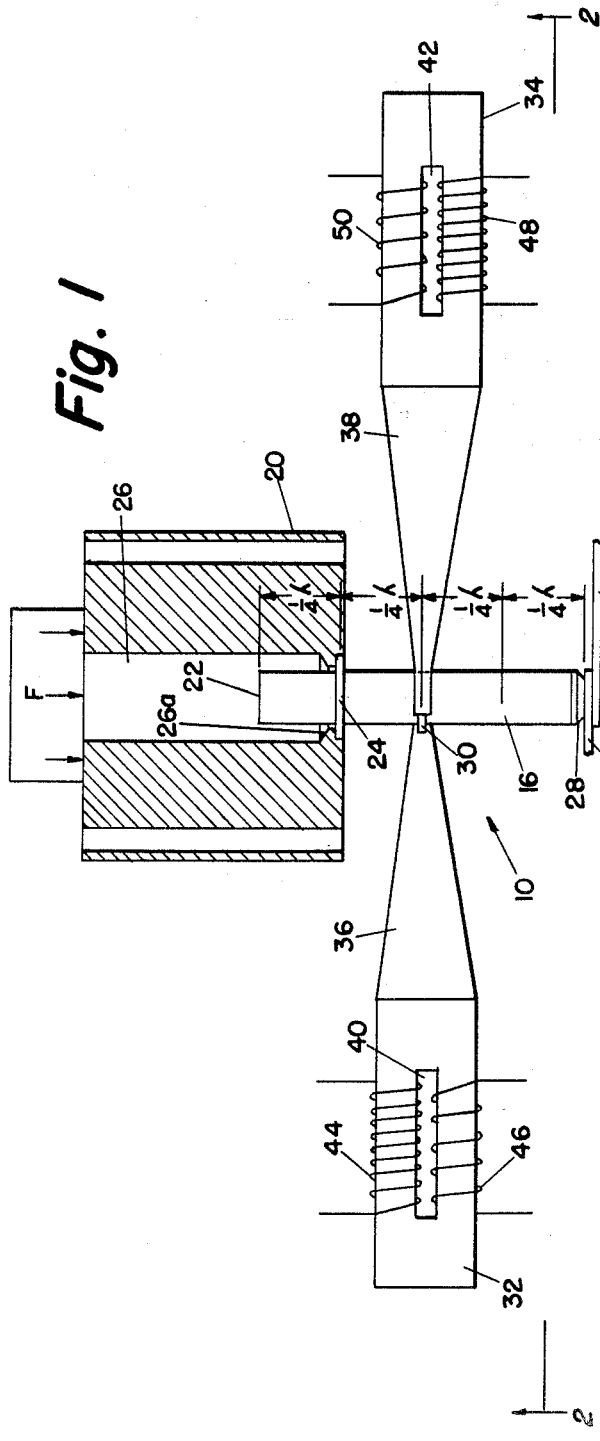

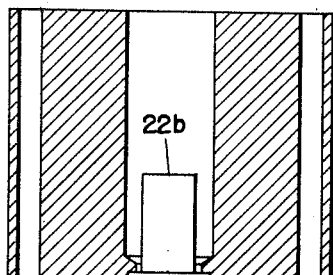
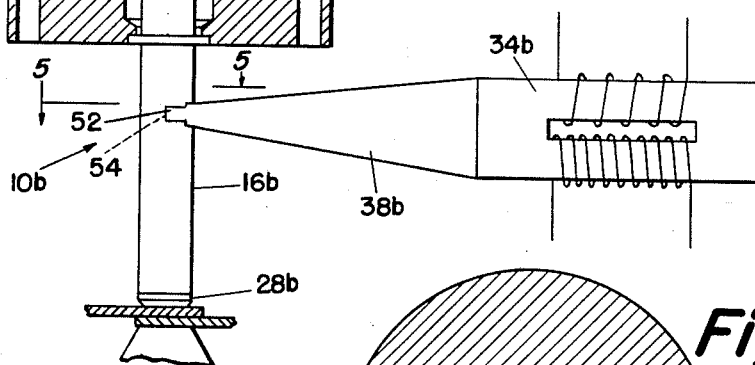
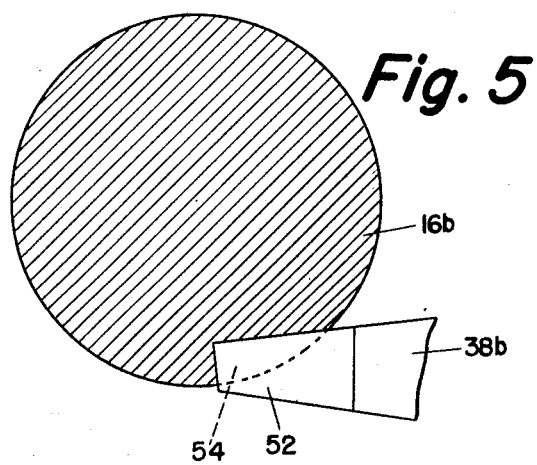
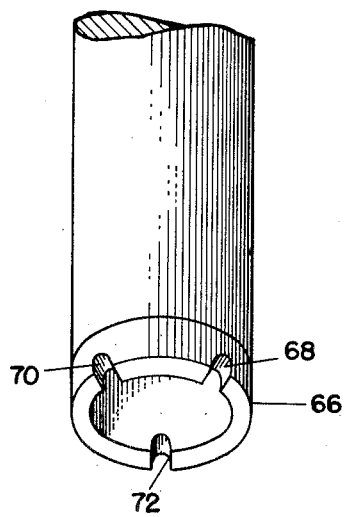

May 25, 1965
J. B. JONES ETAL
3,184,841
METHOD AND APPARATUS EMPLOYING VIBRATORY ENERGY FOR BONDING METALS
Filed June 3, 1958
7 Sheets-Sheet 4
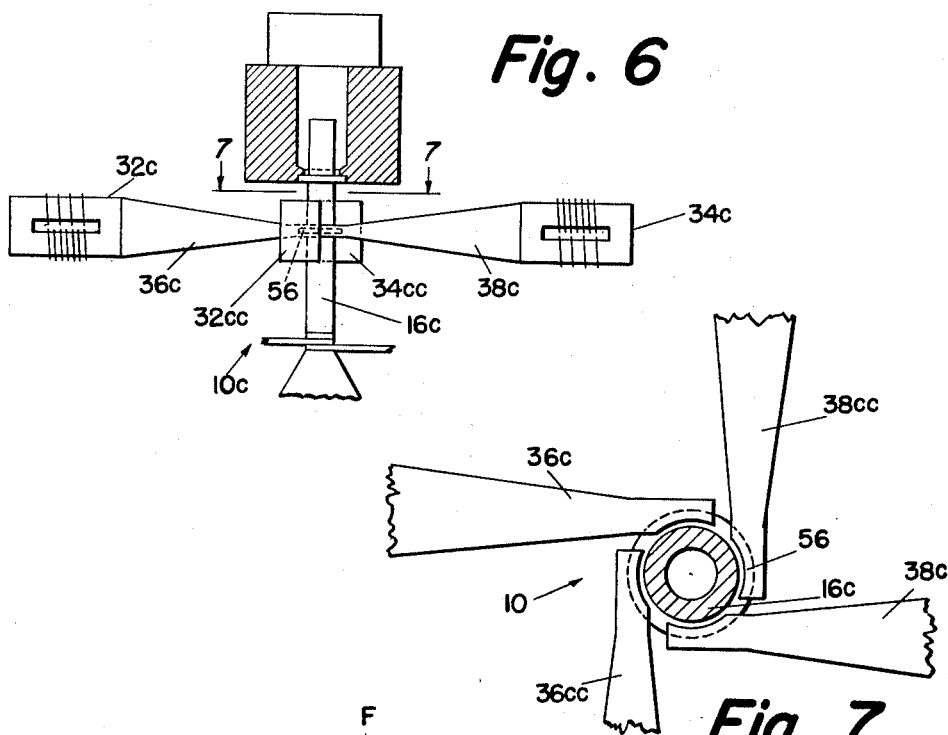
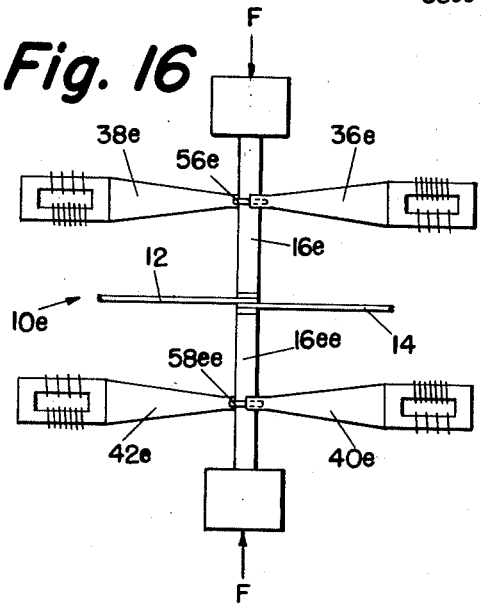
INVENTORS
JAMES BYRON JONES
CARMINE F. DE PRISCO
BY
*Arthur H. Seidel*
ATTORNEY

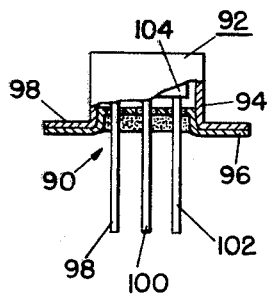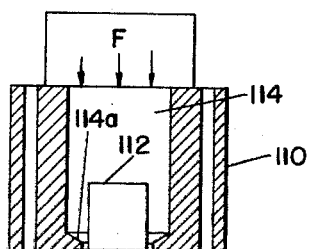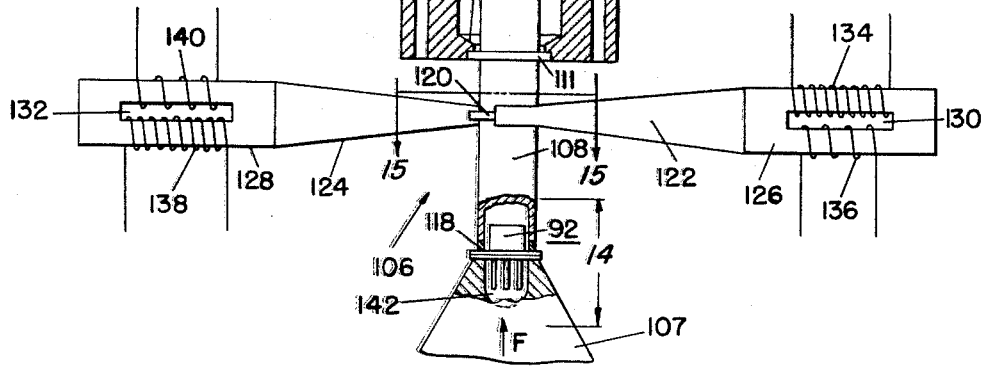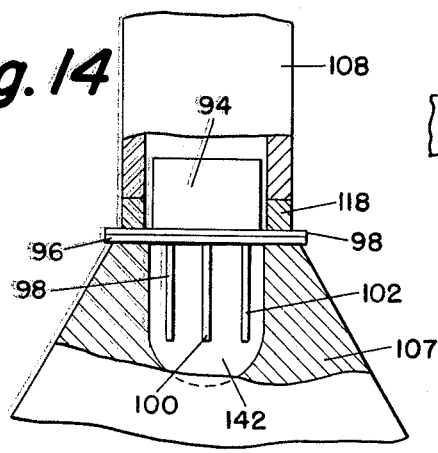

INVENTORS
James Byron Jones
Carmine F. DePrisco

Arthur H. Seidel
ATTORNEY

3,184,841
METHOD AND APPARATUS EMPLOYING VIBRATORY ENERGY FOR BONDING METALS
James Byron Jones, West Chester, and Carmine Frank De Prisco, Glen Mills, Pa., assignors, by mesne assignments, to Sonobond Corporation, West Chester, Pa., a corporation of Pennsylvania
Filed June 3, 1958, Ser. No. 739,555
32 Claims. (Cl. 29—470)

This invention is directed to method and apparatus employing vibratory energy for bonding metals together and to metal weldments formed thereby, and more particularly to method and apparatus employing torsional vibratory energy.

Vibratory welding processes and appartaus have been described in patent applications filed in the name of James Byron Jones, William C. Elmore, and Carmine F. De Prisco, namely Serial No. 467,382 filed November 8, 1954 for "Method and Apparatus Employing Vibratory Energy for Bonding Materials," now abandoned; Serial No. 579,780 filed April 23, 1956 for "Method and Apparatus Employing Vibratory Energy for Bonding Metals" now Patent 2,946,119; Serial No. 579,779 filed April 23, 1956 for "Vibratory Seam Welder and Vibratory Seam Welding Process," now abandoned; and Serial No. 610,991 filed September 5, 1956 for "Method and Apparatus Employing Vibratory Energy for Bonding Meals," now Patent 2,985,954.

The disclosures of each of the above-identified patent applications are incorporated into the subject patent application and made a part hereof.

Where it is desired to encapsulate various types of devices such as transistors, medicaments, surgical items (such as needles and sutures), etc., it often requires expensive and complex fixturing to accomplishg ring-type welds by means of seam-welding equipment, such as described in patent application Serial No. 579,779.

Moreover, for structural purposes, any spot-type weld requires that the load associated with one portion of the weldment be carried into the other portion of the weldment through the spot-type junction, which may offer a lesser cross-section than is desirable. Thus, when forces are carried from one metal member to another metal member through a spot-type junction, whether it be a spot-type weld or a bolt, rivet, staple, or other mechanical fastener, there is a reduced capacity for transferring the load which, in engineering terms, is described as joint efficiency, to compare the strength of the joined assembly with the theoretical strength of the same geometry having no joint. When such structural elements are required to transmit vibration loads or variable loads, as is commonly found in aircraft, failure can be expected adjacent to the reduced area junction, whether it be a bolt, rivet, or a spot-type weld. It is therefore desirable for structural purposes that the largest possible area of the members of the junction be connected. Thus, in the case of weldments, instead of using a spot-type weld, a ring-type weld is one means for effecting greater joint efficiencies. When the junction is a solid-state metallurgical junction instead of a metallurgical junction involving a cast-type structure, as for example is the case with rseistance spot-welding, the advantages are still further enhanced.

We have found that, using novel ultrasonic techniques and equipment, ring-type junctions can be accomplished with a single weld pulse instead of a series of pulses as is required for making overlapping spots or continuous-seam welds.

We have found in particular that such junctions are useful in connection with the encapsulation of transistors, medical and surgical items, and in the fabrication of structural components, etc.

In the hermetic encapsulation of highly delicate items or elements of extreme purity, such as semiconductors, etc., it is essential that the purity of the atmosphere in the capsule be maintained. With ordinary resistance welding there is usually a small amount of arcing, sputtering, or spattering associated with the accomplishment of such weld. Some of the expulsion therefrom goes into the capsule and some goes outside of the capsule. That going into the capsule constitutes a contaminant in the form of gas, metallic ions, etc., which is highly undesirable, particularly in the case of encapsulated semiconductors.

In accordance with the present invention vibratory welding is accomplished by the use of torsional vibration rather than by the means set forth in the aforesaid patent applications. The torsional vibration of bars is discussed from a theoretical point of view at pages 64 and 65 of Harry F. Olson's book Acoustical Engeering, Second Edition, published in 1947 by D. Van Nostrand Company.

Welding in accordance with the present invention employing torsional vibration may be effected under the conditions heretofore generally developed and set forth in the above-identified patent applications for vibratory welding.

Welding is effected under a clamping force sufficient to hold the metals being welded in firm contact at the intended weld interface.

The clamping force may thus be varied over a wide range. Thus, in a preferred embodiment, the maximum clamping forces need not produce an external deformation [1] of more than about ten percent in weldments effected at room or ambient temperatures. In many cases the extent of deformation is appreciably below 10% and in some instances may be virtually absent altogether. The minimal clamping force to be used in the process of this invention constitutes a force sufficient to maintain the metals being welded in regulated alignment and firm contact, e.g. contacting each other so that the weld may be effected by the application of vibratory energy.

The range of operative clamping pressures which may be employed may be readily ascertained by the user of the process. In all cases the clamping force may be sufficent to effect coupling between the metals being welded and the source of vibratory energy, so that such vibratory energy may be transmitted to the metals.

The operative range of vibratory welding frequencies which may be used includes frequencies wtihin the range 59 to 300,000 cycles per second, with the preferred range constituting 400 to 90,000 cycles per second, and the optimum operating frequency range lying between about 5,000

---
[1] By deformation is meant the change in dimensions of the weldment adjacent the weld zone divided by the aggregate thickness of the weldment members prior to welding; result multiplied by 100 to obtain percentage.

and 75,000 cycles per second. These operating frequencies may be achieved by transducer elements of known design, which are capable of generating elastic vibratory energy of high intensity.

Welding may be and in many instances is initiated at room temperatures or ambient temperatures without the application of heat.[2] If desired, welding may also be initiated at elevated temperatures below the fusion temperature (melting point or solidus temperature of any of the pieces being bonded).[3] Thus, heating the metals to be welded prior to, and/or during welding to a temperature below their fusion temperature may, in some cases, facilitate the ease of welding and lower the power requirements and/or time requisite to achieve welding. The welding process is used to form ring-type or unwelded-center-type spot welds and is also applicable to forming seam welds which are accomplished by overlapping said ring-type or unwelded-center-type welds.

The welding process may be applied to a variety of metals and alloys, examples of which include: aluminum to aluminum; aluminum alloy to aluminum alloy; nickel-plated low-carbon steel to gold-plated iron-nickel-cobalt alloy; copper to copper; aluminum alloy to iron-cobalt-vanadium alloy; etc.

The ring-type or unwelded-center-type welding process embodiment may be accomplished within a wide time range, such as a time range of between about 0.001 second to about 6.0 seconds, with welding under most normal conditions being effected during a time interval of from several hundredths of a second to several seconds.

The welding of most metals can be effected in the ambient atmosphere. However, the process comprehends welding under vacuum conditions or in selected conditions such as atmospheres comprising an inert gas. Furthermore, while the welding process may be effected with metals, such as aluminum, without the extensive precleaning required to effect satisfactory welding by other methods, a degree of precleaning and surface treatment may prove advantageous in the welding of many metals. It may be desirable prior to effecting welding in accordance with the present invention to remove surface contaminants, such as mill scale, hydrocarbon and other lubricants, and the like.

By virtue of the instant vibratory welding invention utilizing torsional vibration it is possible to effect peripheral or circumference-type welding without resort to continuous-seam welding techniques.

The weldments of the present invention produced by the method and apparatus of the present invention include ring-type or annular welds, that is a weld between two metallic objects wherein the weld zone comprises a substantially circular ring, and also discontinuous circular welds, that is a ring-type weld in which the weld is broken in one or more places.

This invention has as an object the provision of a novel vibratory welding process.

This invention has as another object the provision of a vibratory welding process capable of effecting peripheral or circumference-type welding.

This invention has at yet another object the provision of a novel vibratory welding process for effecting ring-type welds.

This invention has as still another object the provision of a novel vibratory welding process utilizing torsional vibratory energy.

This invention has as yet a further object the provision of novel vibratory welding apparatus.

This invention has as a still further object the provision of novel vibratory welding apparatus for effecting peripheral or circumference-type welding.

This invention has as still another object the provision of novel vibratory welding apparatus which effects weldments by the utilization of torsional vibratory energy.

This invention has as still another object the provision of novel weldments.

Other objects will appear hereinafter.

For the purpose of illustrating the invention there are shown, in the drawings, forms which are presently preferred; it being understood, however, that this invention is not limited to the precise arrangements and instrumentalities shown.

Referring to the drawings wherein like reference characters refer to like parts:

FIGURE 1 is a sectional view of one embodiment of a vibratory welding transducer-coupling system of the present invention.

FIGURE 2 is a view taken on line 2—2 of FIGURE 1.

FIGURE 4 is a sectional view of another embodiment of the vibratory welding transducer-coupling system of the present invention.

FIGURE 5 is a section taken on line 5—5 of FIGURE 4.

FIGURE 6 is a sectional view of another embodiment of the vibratory welding transducer-coupling system of the present invention.

FIGURE 7 is a plan view looking downward taken on line 7—7 of FIGURE 6.

FIGURE 8 is a perspective view of a tip used for making a discontinuous ring-type weldment.

FIGURE 9 is a plan sectional view through a weldment effected with the tip of FIGURE 8.

FIGURE 12 is an elevational view, partly in section, of a transistor whose cap and base have been welded together in accordance with the present invention.

FIGURE 13 is an elevational view revealing the apparatus for effecting the welding of the cap and body of the transistor of FIGURE 12.

FIGURE 14 is an enlarged sectional view of the portion of FIGURE 13 shown in the region intermediate the arrowheads designated as 14 in FIGURE 13.

FIGURE 15 is a section taken on line 15—15 of FIGURE 13.

FIGURE 16 is an elevational view of another embodiment of the vibratory welding transducer-coupling system of the present invention.

Figure 3:
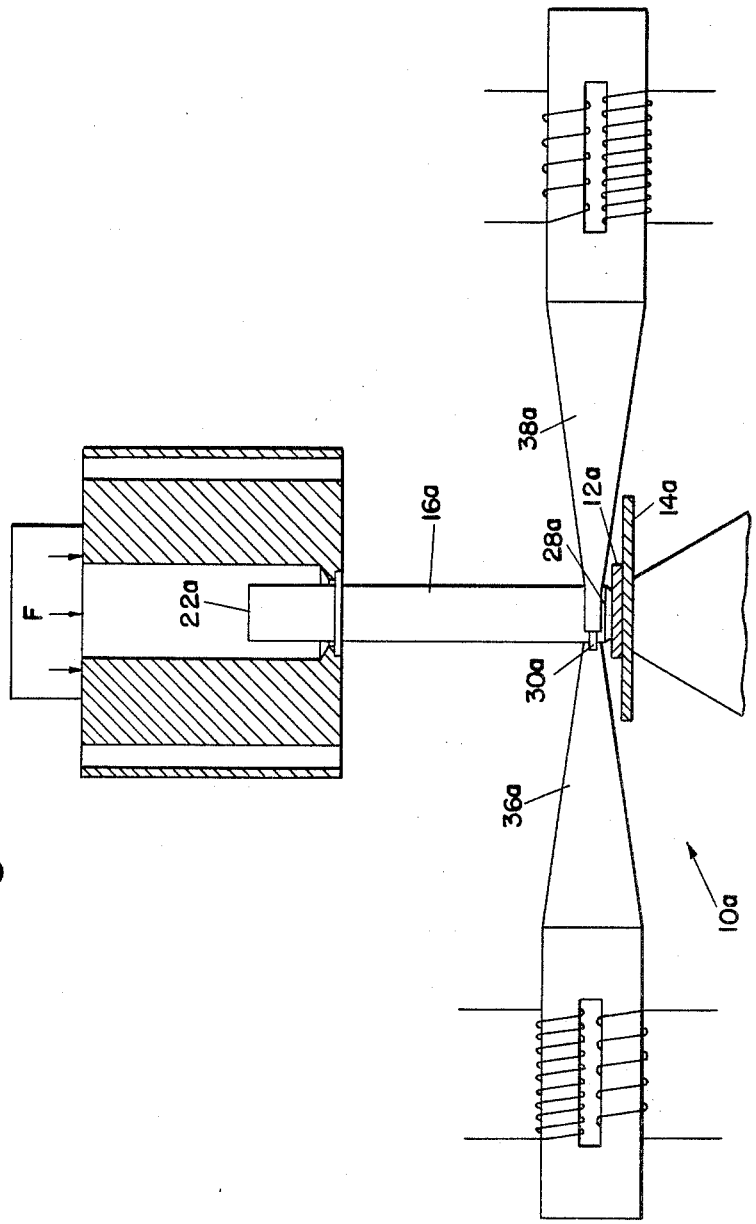
FIGURE 3 is a sectional view of another embodiment of the vibratory welding transducer-coupling system of the present invention.

Referring to the drawings and initially to FIGURES 1 and 2 there is shown therein the vibratory welding transducer-coupling system designated generally as 10.

The metal workpieces 12 and 14 are welded together in accordance with the process of the present invention intermediate the sonotrode 16 and the torsionally rigid anvil 18. By "torsionally rigid" is meant a body that will not readily respond to torsional excitation. As will be made clear from the description set forth hereinafter, the anvil may be powered or non-powered. In either case, the anvil is torsionally rigid, i.e., non-compliant with respect to the peripheral oscillation of the sonotrode tip. As is well known to those skilled in the art, a non-compliant anvil is an anvil which is non-responsive to excur-

---

[2] The weldment may be warm to the touch after the weld due to the application of the elastic vibratory energy.
[3] The temperatures to which the foregoing statements refer are those which can be measured by burying diminutive thermocouples in the weld zone prior to welding, as well as the temperatures which can be estimated or approximated from a metallographic examination of a cross-section of a vibratory weld in the ordinary magnification range up to about 500 diameters.

sions of the sonotrode and is sufficiently rigid so that it can oppose the clamping force which is applied to maintain the metal members in intimate contact at the intended weld zone. Hence, a torsionally rigid anvil is a non-compliant anvil.

The sonotrode 16 in the illustrated embodiment shown in FIGURE 1 comprises a cylindrical tube or rod which is supported by the mass 20. The engagement between the mass 20 and the sonotrode 16 occurs at a true node on the sonotrode 16, as at one-quarter wavelength in torsion or odd unit multiples of one-quarter wavelength in torsion from the free end 22 of sonotrode 16, it being known that attachment of supporting means for vibratory systems at true nodes on said systems is desirable and it having been discovered that true nodes are available at the positions indicated since the free end 22 of sonotrode 16 delivers essentially no power to air. The portion of sonotrode 16 intermediate the region of engagement with the mass 20 and the free end 22 is received within an opening 26 within the mass 20.

The internal diameter of the opening 26 of the mass 20 is larger than the outside diameter of the sonotrode 16, except for a small annular constriction 26a which permits the counterbore to receive the flange 24 of the sonotrode 16. The flange 24 of the sonotrode 16 must be rigidly, preferably metallurgically as by brazing or welding, attached to the mass 20 in the counterbore of the constriction 26a.

The force necessary to maintain the metal workpieces 12 and 14 being welded in regulated alignment and firm contact is designated diagrammatically as "F" and may be supplied in practice by suitable mechanical means which may consist of spring means, compressed air cylinder means, hydraulic cylinder means, and the like.

The lowermost end of sonotrode 16 may be provided with an annular tip 28 which is secured to the sonotrode 16, preferably metallurgically, as by brazing or the like. The lowermost face of annular tip 28 engages the metal workpieces 12 and 14 undergoing welding.

The sonotrode 16 is provided with an integral radially outwardly projecting flange 30 at the driving point which is at a position corresponding approximately to a loop on said sonotrode 16. Thus, in the illustrated embodiment the sonotrode 16 has an over-all length of one wavelength in torsion at the first overtone or second harmonic of its frequency of operation. The free end 22 of sonotrode 16 and the annular tip 28 are both approximately at loops on said sonotrode 16. The flange 30 is one-half wavelength from free end 22 (or one-half wavelength from annular tip 28) and hence is also positioned at a loop, the first overtone or second harmonic having been chosen for convenience in connection with the positioning of the various elements of the system. However, the sonotrode 16 may be constructed to operate at other modes of torsional vibration and the various elements of the system positioned accordingly, as will be explained below. For a given frequency of torsional vibration ($f_1$) the equation for the sonotrode 16 is:

$$f_1 = \frac{1}{2l}\sqrt{\frac{Q}{2\rho(\sigma+1)}}$$

where $l$ is the length of the sonotrode 16 in centimeters, $\rho$ is its density in grams per cubic centimeter, $Q$ is Young's modulus in dynes per square centimeter, and $\sigma$ is Poisson's ratio. The overtones are harmonics of the fundamental, and $f_2=2f_1$, $f_3=3f_1$, $f_4=4f_1$, etc.

The sonotrode 16 is torsionally vibrated by means of the spaced transducers 32 and 34 and their respective couplers 36 and 38, said couplers 36 and 38 being designed to vibrate longitudinally at the same frequency as the sonotrode 16 and being dimensioned, therefore, according to equations already known to the art, as explained in the above-cited patent applications.

The coupler 36 is a tapered metallic element, brazed or otherwise metallurgically secured in end-to-end engagement with transducer 32, and slotted at its small end, at which end it is metallurgically joined, as by brazing, to flange 30 of sonotrode 16 (see in particular FIGURE 2 wherein it will be seen that the coupler member 36 engages about one-fourth of the periphery of flange 30). The coupler member 38 is similarly metallurgically secured in end-to-end engagement to transducer 34, and similarly partially encircles and is metallurgically secured to flange 30 of sonotrode 16, the points of engagement of the coupler members 36 and 38 of the flange 30 being opposed in respect to each other. These tapered coupler members 36 and 38, the cross-section of which may vary, and which may be round, square, or rectangular, may be one-half wavelength long longitudinally or may have a length equal to unit multiples of one-half wavelength longitudinally.

The transducers 32 and 34 each comprise a laminated core of nickel or other magnetostrictive metallic material. Each of the transducers 32 and 34 has a rectangularly shaped opening in its center portion, namely rectangularly shaped opening 40 in transducer 32 and rectangularly shaped opening 42 in transducer 34. A polarizing coil and an excitation coil may be wound through the rectangularly shaped opening in each of the transducers 32 and 34; thus, the polarizing coil 44 and the excitation coil 46 are wound through the rectangularly shaped opening 40 in transducer 32 and the polarizing coil 48 and the excitation coil 50 are wound through the rectangular opening 42 in the transducer 34. Upon variations of the magnetic field strength of the excitation coils there will be produced concomitant variations in the dimensions of the transducers, provided their polarizing coils are charged at a suitable level with D.C. current, and it will be appreciated by those skilled in the art that the frequency of the aforesaid variations, namely the expansion and/or contraction of the magnetostrictive transducers will be equal to the frequency of the alternating electric current flowing in their excitation coils.

The transducers 32 and 34 are each dimensioned to precisely identical dimensions as are the coupler members 36 and 38 so that the vibratory energy delivered to the sonotrode 16 from transducer 32 and coupler member 36 and from transducer 34 and coupler member 38 is identical, for reasons of symmetry. The transducers 32 and 34 are driven in phase with each other, namely both transducers 32 and 34 are either simultaneously expanding or simultaneously contracting.

It is to be understood that the transducers 32 and 34 should be properly dimensioned to insure axial resonance with the frequency of the alternating current applied thereto, so as to cause them to decrease or increase in length according to their coefficients of magnetostriction. The coupler members 36 and 38 should resonate in length at the operating frequency of the transducers, so that the vibratory welding transducer-coupling system 10 may operate efficiently under the welding process conditions. Moreover, the sonotrode 16 should resonate in torsion at the frequency of the transducers 32 and 34 and couplers 36 and 38 to minimize energy losses.

In place of the transducers 32 and 34 shown in the drawings, other magnetostrictive materials may be used such as the alloy 2–V Permendur (an iron-cobalt alloy), a nickel-iron alloy, or Alfenol (an aluminum-iron alloy), each of which should be properly dimensioned to insure axial resonance with the frequency of the alternating current applied thereto, so as to cause it to decrease or increase in length according to its coefficient of magnetostriction. Transducers of the aforesaid type presently constitute a preferred embodiment for operation at frequencies of up to about 75,000 cycles per second, although they may be used at higher frequencies. In place of the aforesaid metallic magnetostrictive materials, the transducer may comprise almost any material which has good physical properties and which changes its physical dimensions under the influence of electric potential or electric current. Thus, it may comprise a piezoelectric material, such as quartz crystals, or an electrostrictive material such as barium titanate, lead zirconate, etc. Such materials presently are preferably used at high frequency operations, as at frequencies above about 75,000 cycles per second, although they can be used at lower frequencies. The transducer may also consist of ferroelectric materials, or an electromagnetic device, such as that which actuates a radio loudspeaker.

In operation the transducer 32 and coupler 36 and the transducer 34 and the coupler 38 vibrate sonotrode 16 torsionally. Thus, there is oscillating peripheral or circumferential motion of the sonotrode 16. The oscillating peripheral or circumferential motion of the tip portion 28 during the torsional vibration of the sonotrode 16 is in phase with the oscillating peripheral or circumferential motion of the free end portion 22 of the sonotrode 16, but is 180 degrees out of phase with the motion of the driven flange 30 which is metallurgically joined to the couplers 36 and 38 when the first overtone or second harmonic of torsional vibration construction is used.

Construction and operation of the sonotrode 16 to conform to the fundamental or first harmonic of torsional bar vibration has the disadvantage of offering but a single node and no loops intermediate the ends of the sonotrode 16. Operations may be effected at other overtones where a larger number of loops intermediate the ends of the sonotrode is desired, for clearance purposes or for embodiments in which coupling to a large number of spaced couplers-transducers is effected to increase the power of the vibratory welding equipment. For example, three nodes and four loops are provided from one end of sonotrode 16 to the other when operation is effected at the second overtone or third harmonic.

As the face of annular tip 28 which is juxtaposed to the uppermost surface of metal workpiece 12 vibrates, it delivers energy to the plane of the contacted area of the metal workpiece 12. This effects vibratory welding between the metal workpieces 12 and 14 in the region in which the same are engaged with the annular tip 28, producing a ring-shaped weld.

For example, under an applied clamping force of three hundred pounds it is possible to effect a ring-shaped weld nineteen-thirtyseconds of an inch in outside diameter with the welded band being five-sixtyfourths of an inch wide in two sheets of 0.012-inch 1100–H14 aluminum alloy using a welding tip of the aforesaid configuration and commencing the welding at room temperature with the welding time extending for a second and one-half at a power level of 500 watts at a frequency of 20,000 cycles per second.

Figure 17:
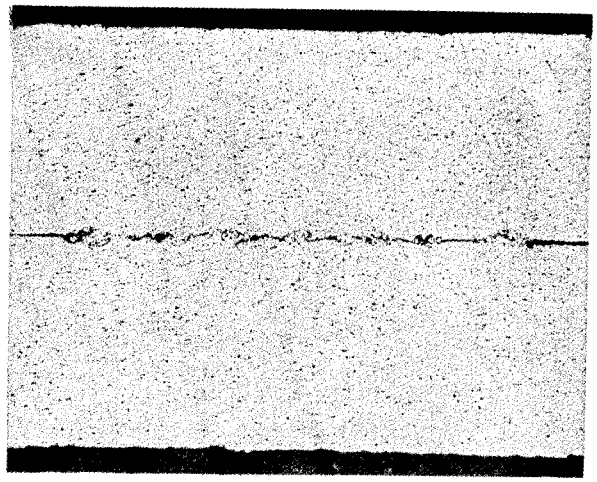
FIGURE 17 is a photomicrograph through a weldment of the present invention enlarged one hundred and fifty times.
Figure 18:
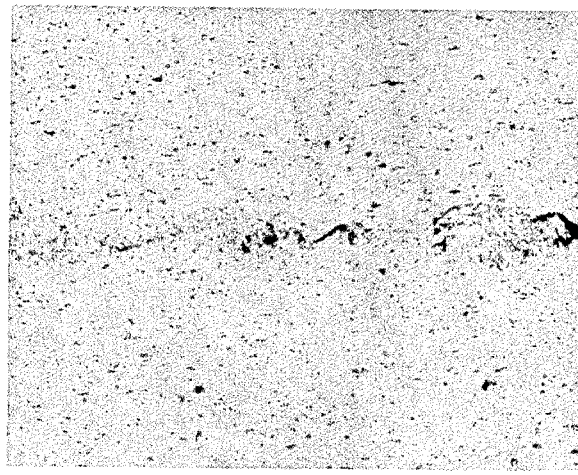
FIGURE 18 is a photomicrograph of the weldment shown in FIGURE 17 enlarged five hundred times.

Photomicrographs enlarged 150 and 500 times respectively through such weldment are shown in FIGURES 17 and 18.

As seen in FIGURE 18 the weldment lacks a fusion cast structure when magnified 500 times and presents an interfacial region that is highly disturbed.

In the embodiment shown in FIGURE 3, the vibratory welding transducer-coupler system 10a generally resembles the vibratory welding transducer-coupler system 10 of FIGURES 1 and 2 except that the coupler members 36a and 38a, which otherwise resemble the coupler members 36 and 38, are secured to the sonotrode 16 at the loop on said sonotrode 16a located at its lowermost end, e.g., adjacent to the weldment. Thus, the flange 30a instead of being positioned one-half wavelength in torsion from the free end 22a of sonotrode 16a as is flange 30 in vibratory welding transducer-coupler system 10 is positioned closely adjacent the tip 28a, this construction again being applicable to the case of operation of the sonotrode 16 at the first overtone or second harmonic of torsional bar vibration. A similar construction could be achieved at the fundamental or at the second overtone, if clearance at the work area is not a problem.

The only other difference between the vibratory welding transducer-coupler system 10a of FIGURE 3 and the vibratory welding transducer-coupler system 10 of FIGURES 1 and 2 is that the sonotrode 16a comprises a solid rod instead of a tube like the sonotrode 16; and the tip 28a presents a full face to the workpieces 12a and 14a undergoing welding, rather than an annular face as is presented by the tip 28 of vibratory welding transducer-coupler system 10. However, even with a full-faced tip, a ring-shaped weld is produced because of the nature of torsional vibration of the sonotrode 16a.

In the embodiment shown in FIGURES 4 and 5, the vibratory welding transducer-coupler system 10b generally resembles the vibratory welding transducer-coupler system 10 of FIGURES 1 and 2, except that in place of a pair of opposed coupler members 36 and 38 and their respective magnetostrictive transducers 32 and 34, there is substituted a single coupler member 38b and a single magnetostrictive transducer 34b. The magnetostrictive transducer 34b of vibratory welding transducer-coupler system 10b generally resembles the magnetostrictive transducer 34 of the vibratory welding transducer-coupler system 10 of the embodiment shown in FIGURES 1 and 2. However, the coupler member 38b instead of being provided with a slotted end which receives a mating flange carried by the sonotrode, as in vibratory welding transducer-coupler system 10, is provided with a tongue 52 of reduced dimensions which is received within a slot 54 cut into the sonotrode 16b. The tongue 52 is metallurgically joined, as by brazing, to the slot 54. The slot 54 replaces the flange 30 used in vibratory welding transducer-coupler system 10. Thus, the slot 54 is located at a loop on sonotrode 16b. The slot 54 in the illustrated embodiment is located one-half wavelength from the annular tip 28b at the lowermost end of the sonotrode 16b, if the sonotrode 16b is constructed to operate at the first overtone or second harmonic of torsional bar vibration.

Expansion and contraction of the magnetostrictive transducer 34b will be transmitted through the coupler member 38b to the sonotrode 16b resulting in torsional vibration of such sonotrode 16b, so as to result in welding together of the metal workpieces as heretofore described, under the outlined auxiliary conditions of force, time, etc. The vibratory welding transducer, coupler system 10b is of more economical construction than the vibratory weld-transducer-coupler system 10.

In FIGURES 6 and 7 there is shown another embodiment 10c of the vibratory welding transducer-coupler system of the present invention. The vibratory welding transducer-coupler system 10c resembles the vibratory welding transducer-coupler system 10 of FIGURES 1 and 2 except that four couplers instead of two are attached to the sonotrode. The sonotrode 16c includes at a loop area a flange, namely the flange 56. The coupler members 36c and 38c are metallurgically joined to flange 56 of sonotrode 16c in the identical fashion in which the couplers 36 and 38 were joined to the flange 30 of sonotrode 16 of vibratory welding transducer-coupling system 10 of the embodiment shown in FIGURES 1 and 2. Each of the couplers 36c and 38c is provided with magnetostrictive transducer, namely the respective magnetostrictive transducers 32c and 34c which are secured in end-to-end engagement with such couplers in the same manner as the magnetostrictive transducers 32 and 34 are secured to the couplers 36 and 38 of the vibratory welding transducer-coupler system 10 shown in FIGURES 1 and 2. Also attached to flange 56 are couplers 36cc and 38cc which, as seen from FIGURE 7, are preferably disposed in ninety-degree space relationship to the couplers 36c and 38c. However, it will be apparent to anyone skilled in the art that the number of transducers-couplers which engage the torsionally vibrating sonotrode member can be even or odd and as many can be located in a plane around a given vibratory loop on the sonotrode as is structurally possible. The couplers 36cc and 38cc carry the magnetostrictive transducers 32cc and 34cc at their respective ends. The metallurgical joinder of transducers to couplers and of couplers to sonotrode is identical to that by which the aforesaid couplers 36 and 38 are joined to flange 30 of sonotrode 16 and the magnetostrictive transducers 32 and 34 are joined to the couplers 36 and 38 in the vibratory welding transducer-coupler system 10 of FIGURES 1 and 2, except that space has been provided for the additional two couplers by moderately shortening the contact arc between flange 56 and the grooved portions of the coupler tips. In a similar manner, a greater number of couplers may be attached to sonotrode 16c, as a total of five or six or seven couplers or even as many as eleven or twelve. Likewise, a second flange may be provided at another loop area on the sonotrode 16c, and one or more couplers may be attached at one flange with one or more other couplers attached at another flange, bearing in mind the physical limitations of the system according to the materials used and so as to provide torsional vibration of the sonotrode 16c. The vibratory welding transducer-coupling 10c permits welding operations in accordance with the method of the present invention to be effected at high power levels, since a multiple number of magnetostrictive transducers and their associated couplers may be utilized.

As heretofore noted, the vibratory welding transducer-coupling systems of the present invention may be used to produce discontinuous ring-type weldments as well as continuous ring-type weldments. In order to produce a discontinuous ring-type weldment, an annular tip may be used having shallow notches disposed in such tip. FIGURE 8 reveals a notched tip 66 which may be carried on any of the vibratory welding transducer-coupling system embodiments herein described. In the particular embodiment shown in FIGURE 8, the tip 66 comprises an annulus which is shallowly notched in three places at 68, 70 and 72.

This tip 66 produces a weldment of the type shown in FIGURE 9, which is a plan view through a weldment 73 in which there is no metallurgical joinder in the portion of the weldment 73 which is juxtaposed to the notched-out parts of the tip. While the non-welded portions of the weldment 73 may not precisely conform with the notched-out portions of the tip, the degree of conformity is substantially close enough so that for most practical purposes the tip may be notched to the degree to which the discontinuities in the ring-type weldment 73 are desired. Thus, in the illustrated embodiment, the notches 68, 70 and 72 in the tip 66 are reflected in the discontinuities 68a, 70a, and 72a in the broken ring-type weld 73 produced by the use of such tip 66.

Figure 10:
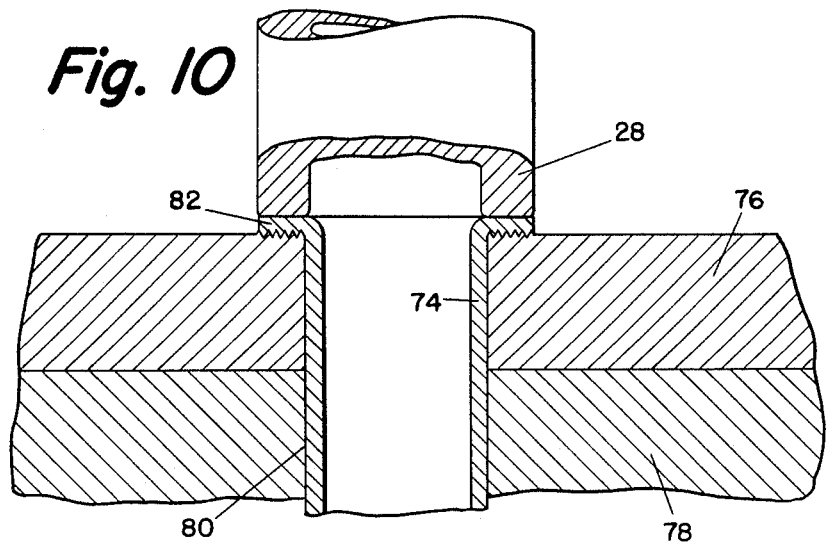
FIGURE 10 is a sectional view revealing diagrammatically the method and apparatus for forming a particular weldment in accordance with the present invention.

In FIGURE 10 there is shown diagrammatically the vibratory welding of a flared tube 74 to a bored plate 76. The vibratory welding transducer-coupling system used to effect such welding may be vibratory welding transducer-coupling system 10 having the annular tip 28. However, in place of anvil 18, an anvil 78 is utilized, which anvil includes a guide passageway 80 through which the flared tube 74 extends. The anvil 78 may be in several pieces, e.g., split like a collet, for effecting facile insertion of the tube and removal of the weldment. Alternatively, if the bored plate 76 is sufficiently heavy, it can be supported in any convenient manner without resorting to a specific anvil configuration.

To effect the weldment shown in FIGURE 10 in sawtooth line, the plate 76 is positioned on support 78 with the flared end 82 of tube 74 juxtaposed to the uppermost surface of plate 76. Upon torsional vibration of sonotrode 16 with its tip 28 under the welding conditions heretofore set forth, the flared end 82 is vibratorily welded to the juxtaposed portion of plate 76 throughout its entire periphery.

Figure 11:
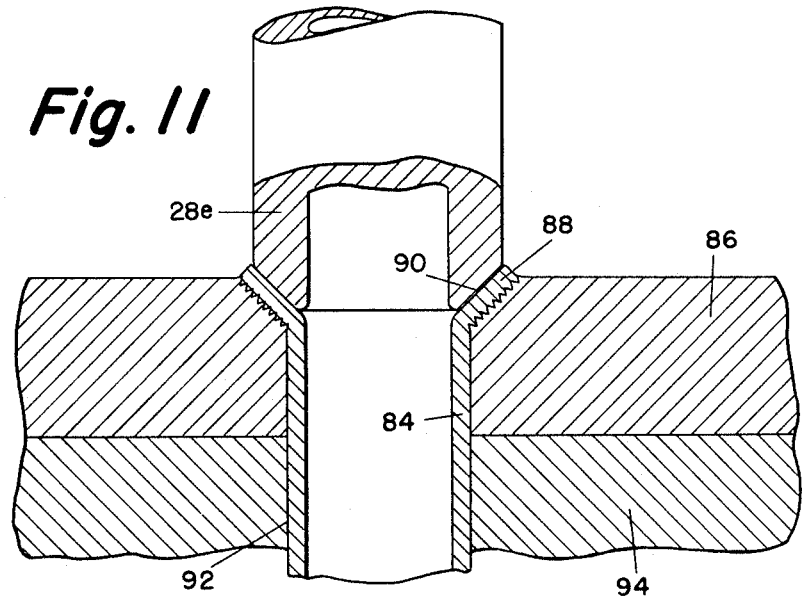
FIGURE 11 is a sectional view revealing diagrammatically another form of apparatus for forming a particular weldment in accordance with the present invention.

In FIGURE 11 there is shown the welding of a flared tube 84 to a bored and countersunk metal plate 86. The flared end 88 of tube 84 is welded to the juxtaposed surface of the countersink in metal plate 86 by means of the action of annular tip 28e. The annular tip 28e may be carried in a vibratory welding transducer-coupling system which is otherwise identical to vibratory welding transducer-coupling system 10. The only difference between annular tip 28e and the annular tip 28 of vibratory welding transducer-coupling system 10 is that the end face 90 of annular tip 28e is contoured to mate with the juxtaposed face of flared end 88. The tube 84 extends through a passageway 92 in anvil 94. The metal plate 86 is supported on flat uppermost surface of anvil 94. As in FIGURE 10, the anvil may be in several pieces or may be dispensed with in favor of other convenient support means. Upon torsional vibration of the sonotrode with its tip 28e, vibratory welding is effected between the juxtaposed surface of the countersink and the outside surface of flared end 88 of tube 84, such weld being diagrammatically indicated by a sawtooth line.

As will be seen from FIGURES 10 and 11, it is possible by using the vibratory welding processes and apparatus of the present invention to readily effect weldments which cannot be readily made by other processes and apparatus.

In FIGURE 12 there is shown the transistor 90 comprising the envelope or case 92 formed from the cap 94 and the base 96. A plurality of leads 98, 100, and 102 extend through the base 96 to the semiconductor element 104. Three leads 98, 100, and 102 are shown in FIGURE 12, but it is to be understood that a different number of such leads may be present depending upon the particular component to be welded. Base 96 has within it a fired ceramic insulation. It is essential for the satisfactory operation of semiconductor devices that chemical purity be maintained within the envelope 92. Prior used fusion welding and soldering techniques for joining the cap 94 to the base 96 produce gaseous or ionic contamination within the envelope 92 of the transistor 90. However, we have found that by torsionally welding the cap 94 to the base 96 at the annular flange 93 of the cap 94 in accordance with our invention contamination by the welding operation can be avoided.

As shown in FIGURES 13, 14 and 15, the vibratory welding transducer-coupling system 106 of the present invention used to effect the aforesaid weldment comprises the sonotrode 108 which comprises a cylindrical tube or rod which is supported by the mass 110. The engagement between the mass 110 and the sonotrode 108 occurs at flange 111 positioned on a true node on the sonotrode 108, as at one-quarter wavelength in torsion or odd unit multiples of one-quarter wavelength in torsion from the free end 112 of sonotrode 108, it being known that attachment of supporting means for vibratory systems at true nodes on said systems is desirable and it having been discovered that true nodes are available at the positions indicated since the free end 112 of sonotrode 108 delivers little or no power to air. The portion of sonotrode 108 intermediate the region of engagement with the mass 110 and the free end 112 is received within an opening 114 within the mass 110.

The internal diameter of opening 114 of the mass 110 is substantially larger than the outside diameter of the sonotrode 108, except for a small annular constriction 114a which permits the counterbore to receive the flange 111 of the sonotrode 108. The flange 111 of the sonotrode 108 must be rigidly, preferably metallurgically as by welding or brazing, attached to the mass 110 in the counterbore of the constriction 114a.

The force necessary to maintain the cap 94 and base 96 of the metal envelope 92 of the transistor 90 which are being welded together in regulated alignment and firm contact is designated diagrammatically as "F" and may be applied in practice by suitable mechanical means which may consist of spring means, compressed air cylinder means, hydraulic cylinder means, and the like.

The lowermost end of the sonotrode 108 may be provided with an annular tip 118 which is secured to the sonotrode 108, preferably metallurgically, as by brazing or the like. The lowermost face of annular tip 118 engages the flange 98 of the cap 94. The raised portion of the cap 94 projects into the opening formed in the sonotrode 108. The sonotrode 108 is provided with an integral radially outwardly projecting flange 120 at the driving point which is at a position corresponding approximately to a loop on said sonotrode 108. Thus, in the illustrated embodiment the sonotrode 108 has an overall length of one wavelength in torsion at the first overtone or second harmonic of its frequency of operation. The free end 112 of sonotrode 108 and the annular tip 118 are both approximately at loops on said sonotrode 108. The flange 120 is one-half wavelength from free end 112 (or one-half wavelength from annular tip 118) and hence is also positioned at a loop, the first overtone or second harmonic having been chosen for convenience in connection with the positioning of the various elements of the system. However, the sonotrode 108 may be constructed to operate at other modes of torsional vibration and the various elements of the system positioned accordingly, as explained heretofore. For a given frequency of torsional vibration ($f_1$) the equation for the sonotrode 108 is:

$$f_1 = \frac{1}{2l}\sqrt{\frac{Q}{2\rho(\sigma+1)}}$$

where $l$ is the length of the sonotrode 108 in centimeters, $\rho$ is its density in grams per cubic centimeter, Q is Young's modulus in dynes per square centimeter, and $\sigma$ is Poisson's ratio. The overtones are harmonics of the fundamental, and $f_2=2f_1$, $f_3=3f_1$, $f_4=4f_1$, etc.

The sonotrode 108 is torsionally vibrated by means of the spaced transducers 126 and 128 and their respective couplers 122 and 124, said couplers 122 and 124 being designed to vibrate longitudinally at the same frequency as the sonotrode 108 and being dimensioned, therefore, according to equations already known to the art, as explained in the above-cited patent applications.

The coupler 122 is a tapered metallic element, brazed or otherwise metallurgically secured in end-to-end engagement with transducer 126, and slotted at its small end, at which end it is metallurgically joined, as by brazing, to flange 120 of sonotrode 108, engaging about one-fourth of the periphery of flange 120, as shown in FIGURE 15. The coupler 124 is similarly metallurgically secured in end-to-end engagement with transducer 128, and similarly partially encircles and is metallurgically secured to flange 120 of sonotrode 108, the points of engagement of the coupler members 122 and 124 to the flange 120 being opposed with respect to each other. These tapered coupler members 122 and 124, the cross-section of which may vary, and which may be round, square, or rectangular, may be one-half wavelength long longitudinally or may have a length equal to unit multiples of one-half wavelength longitudinally.

The transducers 126 and 128 each comprise a laminated core of nickel or other magnetostrictive metallic material. Each of the transducers 126 and 128 has a rectangularly shaped opening in its center portion, namely rectangularly shaped opening 130 in transducer 126 and rectangularly shaped opening 132 in transducer 128. The polarizing coil 134 and excitation coil 136 are wound through the rectangularly shaped opening 130 in transducer 126, and the polarizing coil 138 and the excitation coil 140 are wound through the rectangularly shaped opening 132 in transducer 128. Upon variations of the magnetic field strength of the excitation coils there will be produced concomitant variations in the dimensions of the transducers 126 and 128, provided that their respective polarizing coils 134 and 138 are charged at a suitable level with D.C. current. It will be appreciated by those skilled in the art that the frequency of the aforesaid variations, namely the expansion and/or contraction of the magnetostrictive transducers will be equal to the frequency of the alternating electric current flowing in their excitation coils.

The transducers 126 and 128 are each dimensioned to precisely identical dimensions as are the couplers 122 and 124 so that the vibratory energy delivered to the sonotrode 108 from transducer 126 and coupler 122 and from transducer 128 and coupler 124 is identical. The transducers 126 and 128 are driven in phase with each other, namely both transducers 126 and 128 are either simultaneously expanding or simultaneously contracting.

It is to be understood that the transducers 126 and 128 should be properly dimensioned to insure axial resonance with the frequency of the alternating current applied thereto, so as to cause them to decrease or increase in length according to their coefficients of magnetostriction. The couplers 122 and 124 should resonate in length at the operating frequency of the transducers, so that vibratory welding transducer-coupling system 106 may operate efficiently under the welding process conditions. Moreover, the sonotrode 108 should resonate in torsion at the frequency of the transducers 126 and 128 and couplers 122 and 124 to minimize energy losses.

In place of the transducers 126 and 128 shown in the drawings, other magnetostrictive materials may be used such as the alloy 2–V Permendur (an iron-cobalt alloy), a nickel-iron alloy, or Alfenol (an aluminum-iron alloy), each of which should be properly dimensioned to insure axial resonance with the frequency of the alternating current applied thereto, so as to cause it to decrease or increase in length according to its coefficient of magnetostriction. Transducers of the aforesaid type presently constitute a preferred embodiment for operation at frequencies of up to about 75,000 cycles per second, although they may be used at higher frequencies. In place of the aforesaid metallic magnetostrictive materials, the transducer may comprise almost any material which has good physical properties and which changes its physical dimensions under the influence of electric potential or electric current. Thus, it may comprise a piezoelectric material, such as quartz crystals, or an electrostrictive material such as barium titanate, lead zirconate, etc. Such materials presently are preferably used at high frequency operations, as at frequencies above about 75,000 cycles per second, although they can be used at lower frequencies. The transducer may also consist of ferroelectric materials or an electromagnetic device, such as that which actuates a radio loudspeaker.

The leads 98, 100, and 102 project through the base 96 and are received within socket 142 in torsionally rigid anvil 107. The flat uppermost surface of the anvil 107 engages the underside of the base 96.

In operation the transducer 126 and coupler 122 and the transducer 128 and coupler 124 vibrate sonotrode 108 torsionally. Thus, there is oscillating peripheral or circumferential motion of the sonotrode 108. The oscillating peripheral or circumferential motion of the tip portion 118 during the torsional vibration of the sonotrode 108 is in phase with the oscillating peripheral or circumferential motion of the free end portion 122 of the sonotrode 108, but is 180 degrees out of phase with the motion of the driven flange 120 which is metallurgically joined to the couplers 122 and 124 when the first overtone or second harmonic of torsional vibration construction is used.

Construction and operation of the sonotrode 108 to conform to the fundamental or first harmonic of torsional bar vibration has the disadvantage of offering but a single node and no loops intermediate the ends of the sonotrode 108; however, this construction is usable in some instances. Operations may be effected at other overtones where a larger number of loops intermediate the ends of the sonotrode is desired, for clearance purposes or for embodiments in which coupling to a large number of spaced couplers-transducers is effected to increase the power of the vibratory welding equipment. For example, three nodes and four loops are provided from one end of sonotrode 108 to the other when operation is effected at the second overtone or third harmonic.

As the face of annular tip 118 which is juxtaposed to the uppermost surface of the annular flange 98 of the cap 94 of the envelope 92 of transistor 90 vibrates, it delivers energy to the plane of the contacted area of such flange 98. This effects vibratory welding between such flange 98 and the base 96 in the region in which the same are engaged with the annular tip 118 producing a ring-shaped weld. There is no spattering or contamination into the interior of the envelope 92 from the weldment so-produced.

An example of a satisfactory weldment between a cap 94 and a base 96 of a transistor is the following: a cap made of 2024 aluminum was ring-welded to a base made of gold-plated Kovar (an iron-nickel-cobalt alloy having a trademark of the Stupakoff Division of The Carborundum Company, Latrobe, Ja.) which contained lead wires and a fired ceramic insulation, by means of a three-coupler-three-transducer array attached to the sonotrode, said vibratory welding transducer-coupler system operating at a frequency of 20,000 cycles per second, using a power of 400 watts, a clamping force of 125 pounds, and a welding time of one second, with the weld being commenced at room temperature. A seal was made between cap and base by means of this ring weld which was air-pressure tested and which showed no signs of leakage when immersed in water with the inside of the cap-base pressurized at 15 pounds per square inch and which upon subsequent cycling at 30 pounds per square inch and later at 100 pounds per square inch for 30 minutes showed no sign of dye-penetrant leakage. The tube-type sonotrode used had an outside diameter of three-quarters of an inch and an inside diameter of one-half inch, to which was attached a three-eighths-inch annular tip. Removal of individual cap-base units after welding was effected by an air-ejection array operating inside the sonotrode.

In FIGURE 16 there is revealed an embodiment of the vibratory welding transducer-coupling system, 10e, which is also capable of operating at high power levels. It is an example of a multiple-drive-type array which is capable of accepting and delivering greater amounts of vibratory power and thus effecting ring-type welds of larger diameter, or larger area, or between heavier or harder materials. In the vibratory welding transducer-coupler system 10e there is substituted for the anvil of system 10 of FIGURE 1 a second sonotrode with its associated couplers, transducers, and mass. Thus, in the embodiment shown in FIGURE 16 the metal workpieces 12 and 14, which can comprise with appropriate adjustments the transistor weldments of FIGURES 12 and 14 or the tube-to-header weldments of FIGURES 10 and 11, or the ordinary ring-type welding workpieces, or the discontinuous ring-type welding workpieces of FIGURE 9, are welded together intermediate the sonotrodes 16e and 16ee, with the clamping force being applied between such sonotrodes. The sonotrodes 16e and 16ee operate at the same frequency but are 180 degrees out of phase with each other. The general construction of the flange 56e on the sonotrode 16e and the flange 58ee on the sonotrode 16ee and their associated couplers (couplers 36e and 38e in the case of flange 56e) (and couplers 40e and 42e in the case of flange 58ee); and the construction of their associated transducers follows the construction shown and described in connection with FIGURES 1 and 2 and need not be described herein.

It will be apparent that the construction of the engagement means between coupler and sonotrode, as variously shown in FIGURES 1 and 2 and FIGURES 4 and 5, for example, is interchangeable in the various embodiments herein disclosed, and that, likewise, the sonotrode member may consist of either a hollow tube or a solid rod in the various embodiments shown, these having been presented as shown in the various embodiments to illustrate some of a variety of elements which may be utilized in connection with the invention.

The present invention may be embodied in other specific forms without departing from the spirit or essential attributes thereof, since other means of effecting torsional vibration in a member or in members contacting the weldment can be adapted from other fields. Accordingly, reference should be made to the appended claims rather than to the foregoing specification as indicating the scope of the invention.

It is claimed:

1. A method of welding metal workpieces which comprises placing to-be-welded faces of the metal workpieces together, applying a force to the metal workpieces in a direction and of a magnitude to hold the contacting to-be-welded faces of the metal members in intimate contact at the intended weld zone and to couple mechanical vibratory energy into said zone, and introducing through a torsionally vibrating element contacting one of the to-be-welded metal workpieces adjacent the weld zone mechanical vibration having a frequency of between about 59 and 300,000 cycles per second, whereby the peripheral portion of said element which engages the workpieces oscillates circumferentially, with the direction of the mechanical vibration delivered to the workpieces by the peripheral portion of said element being substantially parallel to the interface of the workpieces at the weld zone and with the vibratory energy introduced to said workpieces from said vibrating element being at a sufficient energy level to weld the metal members together.

2. A process in accordance with claim 1 in which said element vibrates at a frequency of between 400 and 90,000 cycles per second.

3. A process in accordance with claim 2 in which said element vibrates at a frequency of between 5,000 and 75,000 cycles per second.

4. A process in accordance with claim 1 in which the welding is achieved within a time range of between about 0.001 seconds to about 6.0 seconds.

5. A process in accordance with claim 1 including the step of opposing said force by torsionally vibrating a second element 180 degrees out of phase with respect to said first mentioned element, with said metal workpieces and the weld zone being between said elements in a manner so that the longitudinal axes of said elements are substantially perpendicular to the plane of said workpieces at the weld zone.

6. A welding device for welding together the contacting surfaces of a plurality of metal members, said device including a pair of facing metal jaws between which the metal members are placed, means for impelling said jaws together so as to maintain the metal members in intimate contact at the intended weld zone, and means structurally interrelated with at least one of said jaws for torsionally vibrating said one jaw so that the outer peripheral portion of said one jaw oscillates circumferentially, with the torsional vibratory energy of said one jaw being introduced to one of said metal members at a sufficient energy level to weld the metal members together, and said other jaw being torsionally rigid with respect to the circumferential oscillation of said one jaw.

7. A welding device in accordance with claim 6 in which said one jaw is provided with two free ends, each of said two free ends being positioned at a vibratory loop in torsion on said one jaw.

8. A welding device in accordance with claim 6 in which the means for torsionally vibrating said one jaw is angularly disposed in respect to said jaw and is engaged with said jaw at a loop in torsion of said jaw.

9. A welding device in accordance with claim 6 in which the face of said one jaw which engages the metal members undergoing welding is an annulus.

10. A welding device in accordance with claim 9 in which the face of said one jaw which engages the metal members undergoing welding is notched.

11. A welding device in accordance with claim 6 in which the means for torsionally vibrating said one jaw vibrates said one jaw at a frequency of between 59 and 300,000 cycles per second.

12. A welding device in accordance with claim 6 in which the means for torsionally vibrating said one jaw vibrates said one jaw at a frequency of between 400 and 75,000 cycles per second.

13. A welding device in accordance with claim 6 in which the means for torsionally vibrating said one jaw vibrates said one jaw at a frequency of between 5,000 and 40,000 cycles per second.

14. A welding device in accordance with claim 6 having means engaged with said outer jaw for torsionally vibrating said other jaw, said last-mentioned means being 180 degrees out of phase with respect to the means for torsionally vibrating said one jaw.

15. A welding device in accordance with claim 6 in which the means for torsionally vibrating said one jaw comprises at least one elongated coupler secured to an appreciable peripheral portion of said one jaw at a loop in torsion on said one jaw and angularly disposed in respect to said one jaw, and means for vibrating said coupler axially engaging the end of said coupler opposite to said one jaw.

16. A welding device in accordance with claim 15 comprising a plurality of couplers secured to said one jaw.

17. A welding device in accordance with claim 16 in which the couplers are opposed to each other.

18. In a welding device for welding together the contacting surfaces of a plurality of non-compliantly supported metal members comprising a metal jaw, means for impelling an end surface on one end of said jaw into contact with one of the metal members so as to maintain the metal members in intimate contact at the intended weld zone, said end surface being adapted to lie in a plane parallel to the plane of the interface between the metal members, and means coupled to said jaw for torsionally vibrating said jaw so that the outer peripheral portion of said jaw oscillates circumferentially, with the torsional vibratory energy of said jaw end surface being at a sufficient energy level to weld the metal members together.

19. In a device in accordance with claim 18 wherein said end of said jaw is hollow, and said end surface being annular in transverse cross section.

20. In a welding device for welding together the contacting surfaces of a plurality of members comprising an elongated rod, a non-compliant support means for the metal members spaced from a tip portion of said rod, means for urging said tip portion towards said support means so as to maintain the metal members in intimate contact at the intended weld zone, said tip portion having an end surface which lies in a plane which is substantially parallel to the interface between the metal members, and means coupled to said rod for torsionally vibrating said rod so that the periphery of said rod oscillates circumferentially with the torsional vibratory energy of said tip portion being at a sufficient energy level to weld the metal members together with a non-fusion weld.

21. A welding device in accordance with claim 20 in which the means for torsionally vibrating said rod comprises a coupler angularly secured to said rod, and a vibrating means axially secured to the end of said coupler opposite said rod.

22. A welding device in accordance with claim 21 in which the means for torsionally vibrating the rod comprises a plurality of couplers secured about the periphery of said rod, with each of said couplers having vibrating means at its end opposed to said rod.

23. A welding device in accordance with claim 20 in which the means for torsionally vibrating the rod is angularly secured to said rod essentially at a vibratory loop in torsion on said rod, and in which said rod is supported at a node intermediate its ends, and in which the free ends of said rod oscillate in phase with each other.

24. A welding device in accordance with claim 20 in which the means for torsionally vibrating the rod is secured to the rod at the end of said rod which is juxtaposed to the support means.

25. A welding device in accordance with claim 20 in which the means for torsionally vibrating the rod is secured to said rod essentially at a vibratory loop in torsion on said rod spaced from the end of said rod juxtaposed to the support means.

26. A welding device in accordance with claim 20 in which the means for torsionally vibrating said rod comprises at least one coupler secured to an appreciable peripheral portion of the rod essentially at a vibratory loop in torsion on said rod and angularly disposed in respect to said rod, and means for vibrating said coupler axially engaging said coupler.

27. A welding device in accordance with claim 20 comprising a plurality of opposed means coupled to said rod.

28. A welding device for welding together the contacting surfaces of a plurality of metal members including an anvil and a jaw spaced from said anvil, said anvil including at least one passageway extending from the face of said anvil juxtaposed to said jaw into the interior of said anvil, said passageway facilitating the support of elongated objects on said anvil, means for impelling said jaw towards said anvil so as to maintain the metal members in intimate contact at the intended weld zone, and means engaged with said jaw for torsionally vibrating said jaw so that said jaw oscillates circumferentially, and the torsional vibratory energy of said jaw being at a sufficient energy level to weld the metal members together.

29. A welding device in accordance with claim 28 in which the portion of the jaw juxtaposed to the anvil comprises an annulus.

30. A method of welding workpieces which comprises the steps of placing to-be-welded faces of the workpieces together, applying a force to the workpieces in a direction and of a magnitude to hold the contacting to-be-welded faces of the workpieces in intimate contact at the intended weld zone and to couple mechanical vibratory energy into said zone, contacting one of the to-be-welded workpieces adjacent the intended weld zone with a torsionally resonant element, torsionally vibrating said element so that the peripheral portion of said element which engages the one workpiece oscillates circumferentially, and introducing through said torsionally vibrating element continuous wave mechanical vibration having a frequency of between about 59 and 300,000 cycles per second, with the direction of the mechanical vibration delivered to the workpieces by the peripheral portion of said element being substantially parallel to the interface of the workpieces at the weld zone and with the energy introduced to said workpieces from said vibrating element being at a sufficient energy level to weld the workpieces together with a non-fusion weld.

31. A method of welding metal workpieces with an arcuate weld which comprises placing to-be-welded faces of the metal workpieces together, applying a force to the metal workpieces in a direction and of a magnitude to hold the contacting to-be-welded faces of the metal workpieces in intimate contact at the intended arcuate weld zone and to couple mechanical vibratory energy into said zone, joining said workpieces with an arcuate weld by introducing through a torsionally vibrating element contacting one of the to-be-welded metal workpieces adjacent the weld zone mechanical vibration having a frequency of between about 59 and 300,000 cycles per second, whereby the peripheral portion of said element which engages the one workpiece oscillates circumferentially at the intended arcuate weld zone, with the direction of the mechanical vibration delivered to the workpieces by the peripheral portion of said element being substantially parallel to the interface of the workpieces at the weld zone and with the vibratory energy introduced to said workpieces from said vibrating element being at a sufficient energy level to weld the workpieces together.

32. A method of welding metal members together with an arcuate weld which comprises holding contacting to-be-welded faces of the metal members together between a pair of torsionally vibrating jaws vibrating out of phase with respect to each other with a force and of a magnitude and direction to hold the to-be-welded faces of the metal members in intimate contact at the intended arcuate weld zone and to couple mechanical vibratory energy into said zone, and introducing substantially continuous wave mechanical torsional vibration having a frequency of between about 400 and 90,000 cycles per second to said intimately contacted metal members through the end face of at least one of said jaws which is engaged with an outer face of one of the metal members adjacent the intended weld zone, said substantially continuous wave mechanical torsional vibration being of an energy level sufficient to weld the metal members to each other with an arcuate weld with the temperature in the weld zone (such temperature being that which can be determined with a thermocouple) during the introduction of the vibration being below the melting temperature of any of the metal members.

References Cited by the Examiner

UNITED STATES PATENTS

| | | | |
|---|---|---|---|
| 2,209,909 | 7/40 | Whitesell | 189—36 |
| 2,679,305 | 5/54 | Gunthorp | 189—36 |
| 2,707,821 | 5/55 | Sowter | 29—470.1 |
| 2,707,889 | 5/55 | Sowter | 29—470.1 |
| 2,730,103 | 1/56 | Mackta. | |
| 2,834,158 | 5/58 | Petermann. | |
| 2,921,372 | 1/60 | Bodine | 310—26 X |
| 2,946,119 | 7/60 | Jones et al. | 29—470 |
| 3,002,871 | 10/61 | Tramm et al. | 29—498 X |
| 3,006,068 | 10/61 | Anderson et al. | 29—504 X |
| 3,046,649 | 7/62 | Brennan | 29—149.5 X |

JOHN F. CAMPBELL, *Primary Examiner.*

WHITMORE A. WILTZ, *Examiner.*